United States Patent
Yang et al.

(10) Patent No.: US 12,189,236 B2
(45) Date of Patent: Jan. 7, 2025

(54) BACKLIGHT MODULE AND DISPLAY DEVICE

(71) Applicant: Wuhan China Star Optoelectronics Technology Co., Ltd., Hubei (CN)

(72) Inventors: Yong Yang, Hubei (CN); Fancheng Liu, Hubei (CN); Guowei Zha, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/765,008

(22) PCT Filed: Mar. 17, 2022

(86) PCT No.: PCT/CN2022/081407
§ 371 (c)(1),
(2) Date: Sep. 14, 2023

(87) PCT Pub. No.: WO2023/168738
PCT Pub. Date: Sep. 14, 2023

(65) Prior Publication Data
US 2024/0069383 A1    Feb. 29, 2024

(30) Foreign Application Priority Data
Mar. 10, 2022  (CN) .......................... 202210234184.2

(51) Int. Cl.
*G02F 1/13357* (2006.01)

(52) U.S. Cl.
CPC .. *G02F 1/133611* (2013.01); *G02F 1/133603* (2013.01); *G02F 1/133605* (2013.01)

(58) Field of Classification Search
CPC ......... G02F 1/133611; G02F 1/133603; G02F 1/133605
See application file for complete search history.

(56) References Cited

U.S. PATENT DOCUMENTS

2010/0102743 A1* 4/2010 Hou ..................... H01L 25/0753
315/250
2012/0268688 A1* 10/2012 Sato .................. G02F 1/133603
362/609
(Continued)

FOREIGN PATENT DOCUMENTS

CN 102650383 A * 8/2012 ............... F21K 9/62
CN 104456292 3/2015
(Continued)

OTHER PUBLICATIONS

International Search Report and the Written Opinion Dated Nov. 28, 2022 From the International Searching Authority Re. Application No. PCT/CN2022/081407 and Its Translation Into English. (19 Pages).

*Primary Examiner* — Erin Kryukova

(57) ABSTRACT

The present application discloses a backlight module and a display device, backlight module includes a substrate, a plurality of light sources, a plurality of barrier wall units and a light adjusting layer. The substrate includes a plurality of function regions and a plurality of non-function regions. Each of the function regions includes at least one light source. The barrier wall units are disposed in non-function regions. The light adjusting layer includes a plurality of patterned light adjusting units disposed to correspond to the function regions. The patterned light adjusting units with the barrier wall units can improve entire light emission brightness of the backlight module to achieve even light emission of an entire surface.

14 Claims, 6 Drawing Sheets

(56) References Cited

U.S. PATENT DOCUMENTS

| | | | |
|---|---|---|---|
| 2015/0124434 A1* | 5/2015 | Chang | G02F 1/133605 |
| | | | 362/97.3 |
| 2020/0073174 A1* | 3/2020 | Yasunaga | G02F 1/133603 |
| 2020/0183234 A1* | 6/2020 | Kim | G02F 1/133611 |
| 2021/0026202 A1* | 1/2021 | Nam | G02F 1/133609 |
| 2021/0349352 A1* | 11/2021 | Ito | G02F 1/133611 |
| 2022/0413192 A1* | 12/2022 | Ito | G02F 1/133611 |

FOREIGN PATENT DOCUMENTS

| | | | | |
|---|---|---|---|---|
| CN | 104501034 | | 4/2015 | |
| CN | 104930399 A | * | 9/2015 | ....... G02F 1/133603 |
| CN | 104501034 B | * | 3/2017 | ....... G02F 1/133603 |
| CN | 107703678 | | 2/2018 | |
| CN | 108572481 | | 9/2018 | |
| CN | 109946873 | | 6/2019 | |
| CN | 110967875 | | 4/2020 | |
| CN | 111061091 | | 4/2020 | |
| CN | 112596304 | | 4/2021 | |
| CN | 113589590 | | 11/2021 | |
| CN | 113885254 | | 1/2022 | |
| CN | 215867453 | | 2/2022 | |
| CN | 114153095 | | 3/2022 | |
| JP | 2010-272245 | | 12/2010 | |

\* cited by examiner

BACKLIGHT MODULE AND DISPLAY DEVICE

RELATED APPLICATIONS

This application is a National Phase of PCT Patent Application No. PCT/CN2022/081407 having International filing date of Mar. 17, 2022, which claims the benefit of priority of China Patent Application No. 202210234184.2 filed on Mar. 10, 2022. The contents of the above applications are all incorporated by reference as if fully set forth herein in their entirety.

FIELD AND BACKGROUND OF THE INVENTION

The present application relates to a field of display technologies, especially to a backlight module and a display device.

Mini light emitting diode (Mini-LED) technologies comprise many advantages such as high contrast, divisional control, and lower power consumption, and can be adapted for products of various sizes from cell phones to televisions according to requirements for specifications of products. Because influence of a thickness of a lamp board substrate and film layers, a mini-LED backlight module is thicker compared to a common edge-lit backlight, and therefore a thickness of a consumer electronic products adopting the mini-LED backlight module is thicker, which departs from a trend of lightness and compactness of current consumer electronics products.

SUMMARY OF THE INVENTION

Technical Solution

To solve the above questions, the present application provides technical solutions as follows:

The present application provides a backlight module, comprising:
  a substrate comprising a plurality of function regions and a plurality of non-function regions, wherein the non-function regions surround a periphery of the function regions;
  a plurality of light sources disposed on a side of the substrate, wherein each of the function regions comprise at least one of the light sources;
  a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and
  a light adjusting layer disposed on a side of a light exiting surface of the light sources, wherein the light adjusting layer comprises a plurality of patterned light adjusting units, the patterned light adjusting units are disposed to correspond to the function regions, and a material of the light adjusting layer comprises aluminum and silver.

According to the backlight module provided by the present application, one of the light sources is disposed in each of the function regions; the function regions comprise:
  first function regions disposed with the light sources; and
  second function regions disposed between the first function regions and the non-function regions;
  wherein each of the patterned light adjusting units comprises:
  a first light adjusting portion disposed to correspond to the light sources; and
  a second light adjusting portion disposed to correspond to the second function regions; and
  wherein a light transmittance of the first light adjusting portion is less than a light transmittance of the second light adjusting portion, and the light transmittance of the second light adjusting portion gradually increases along a direction from a side near the first light adjusting portion to a side away from the first light adjusting portion.

According to the backlight module provided by the present application, the first light adjusting portion comprises a plurality of first apertures, and the second light adjusting portion comprises a plurality of second apertures; and
  an area of each of the first apertures is less than an area of each of the second apertures, and the area of each of the first apertures in the second light adjusting portion along the direction from the side near the first light adjusting portion to the side away from the first light adjusting portion gradually increases.

According to the backlight module provided by the present application, at least two of the light sources are disposed in each of the function regions; the function regions comprise:
  a plurality of first function regions disposed with the light sources;
  a plurality of second function regions disposed between the first function regions and the non-function regions; and
  a plurality of third function regions, wherein each of the third function regions is disposed between adjacent two of the first function regions;
  wherein each of the patterned light adjusting units comprises:
  a first light adjusting portion disposed to correspond to the light sources;
  a second light adjusting portion disposed to correspond to the second function regions; and
  a third light adjusting portion disposed to correspond to the third function regions; and
  wherein a light transmittance of the first light adjusting portion is less than a light transmittance of the second light adjusting portion and a light transmittance of the third light adjusting portion, and the light transmittance of the second light adjusting portion and the light transmittance of the third light adjusting portion gradually increase along a direction from a side near the first light adjusting portion to a side away from the first light adjusting portion.

According to the backlight module provided by the present application, the first light adjusting portion comprises a plurality of first apertures, the second light adjusting portion comprises a plurality of second apertures, the third light adjusting portion comprises a plurality of third aperture; and
  an area of each of the first apertures is less than an area of the second apertures and an area of each of the third apertures, and along the direction from the side near the first light adjusting portion to the side away from the first light adjusting portion, the area of each of the second apertures in the second light adjusting portion gradually increases and the area of each of the third apertures in the third light adjusting portion.

According to the backlight module provided by the present application, each of the second function regions along a second direction is greater than or equal to 0.3 millimeters, and the second direction is an extension direction of a connection line between central points of adjacent two of the light sources.

According to the backlight module provided by the present application, along the second direction, a distance between adjacent two of the light sources is p, and a width of each of the barrier wall units is greater than or equal to p/2 and is less than or equal to p.

According to the backlight module provided by the present application, a thickness of the light adjusting layer ranges from 0.1 microns to 100 microns.

The present application provides a backlight module, comprising:
- a substrate comprising a plurality of function regions and a plurality of non-function regions, wherein the non-function regions surround a periphery of the function regions;
- a plurality of light sources disposed on a side of the substrate, wherein each of the function regions comprise at least one of the light sources;
- a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and
- a light adjusting layer disposed on a side of a light exiting surface of the light sources, wherein the light adjusting layer comprises a plurality of patterned light adjusting units, and the patterned light adjusting units are disposed to correspond to the function region.

According to the backlight module provided by the present application, one of the light sources is disposed in each of the function regions; the function regions comprise:
- first function regions disposed with the light sources; and
- second function regions disposed between the first function regions and the non-function regions;
- wherein each of the patterned light adjusting units comprises:
- a first light adjusting portion disposed to correspond to the light sources; and
- a second light adjusting portion disposed to correspond to the second function regions; and
- wherein a light transmittance of the first light adjusting portion is less than a light transmittance of the second light adjusting portion, and the light transmittance of the second light adjusting portion gradually increases along a direction from a side near the first light adjusting portion to a side away from the first light adjusting portion.

According to the backlight module provided by the present application, the first light adjusting portion comprises a plurality of first apertures, and the second light adjusting portion comprises a plurality of second apertures; and
- an area of each of the first apertures is less than an area of each of the second apertures, and the area of each of the first apertures in the second light adjusting portion along the direction from the side near the first light adjusting portion to the side away from the first light adjusting portion gradually increases.

According to the backlight module provided by the present application, at least two of the light sources are disposed in each of the function regions; the function regions comprise:
- a plurality of first function regions disposed with the light sources;
- a plurality of second function regions disposed between the first function regions and the non-function regions; and
- a plurality of third function regions, wherein each of the third function regions is disposed between adjacent two of the first function regions;
- wherein each of the patterned light adjusting units comprises:
- a first light adjusting portion disposed to correspond to the light sources;
- a second light adjusting portion disposed to correspond to the second function regions; and
- a third light adjusting portion disposed to correspond to the third function regions; and
- wherein a light transmittance of the first light adjusting portion is less than a light transmittance of the second light adjusting portion and a light transmittance of the third light adjusting portion, and the light transmittance of the second light adjusting portion and the light transmittance of the third light adjusting portion gradually increase along a direction from a side near the first light adjusting portion to a side away from the first light adjusting portion.

According to the backlight module provided by the present application, the first light adjusting portion comprises a plurality of first apertures, the second light adjusting portion comprises a plurality of second apertures, the third light adjusting portion comprises a plurality of third aperture; and
- an area of each of the first apertures is less than an area of the second apertures and an area of each of the third apertures, and along the direction from the side near the first light adjusting portion to the side away from the first light adjusting portion, the area of each of the second apertures in the second light adjusting portion gradually increases and the area of each of the third apertures in the third light adjusting portion.

According to the backlight module provided by the present application, a width of each of the second function regions along a second direction is greater than or equal to 0.3 millimeters, and the second direction is an extension direction of a connection line between central points of adjacent two of the light sources.

According to the backlight module provided by the present application, along the second direction, a distance between adjacent two of the light sources is p, and a width of each of the barrier wall units is greater than or equal to p/2 and is less than or equal to p.

According to the backlight module provided by the present application, a thickness of the light adjusting layer ranges from 0.1 microns to 100 microns.

According to the backlight module provided by the present application, a reflection rate of the light adjusting layer is greater than or equal to 90%.

According to the backlight module provided by the present application, the backlight module further comprises a protection layer, the protection layer covers a side of the light adjusting layer away from the substrate; wherein a refractive index of the protection layer is greater than or equal to a refractive index of the light adjusting layer.

According to the backlight module provided by the present application, the backlight module further comprises an encapsulation sealant layer, the encapsulation sealant layer covers sides of the light sources and the barrier wall units away from the substrate, and the light adjusting layer is disposed on a side of the encapsulation sealant layer away from the substrate.

The present application provides a display device, comprising the above backlight module; and
- a display panel disposed on a side of a light exiting surface of the backlight module;
- wherein the backlight module comprises:
- a substrate comprising a plurality of function regions and a plurality of non-function regions, wherein the non-function regions surround a periphery of the function regions;
- a plurality of light sources disposed on a side of the substrate, wherein each of the function regions comprise at least one of the light sources;
- a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and
- a light adjusting layer disposed on a side of a light exiting surface of the light sources, wherein the light adjusting layer comprises a plurality of patterned light adjusting units, and the patterned light adjusting units are disposed to correspond to the function region.

Advantages

Advantages of the present application are as follows: The backlight module and the display device of the present application dispose barrier wall units of specific shapes on a substrate, light reflected on surfaces of the barrier wall units can be converted to exiting light along a collimation direction, which can reduce an optical waveguide effect of light among adjacent light sources, advantages improvement of entire light emission brightness of the backlight module, and achieves high efficiency light emission. Also, a light adjusting layer comprising a plurality of patterned light adjusting units is disposed on a side of light exiting surfaces of the light sources. A light transmittance of each of the patterned light adjusting units gradually increases along a direction from a side near light sources to a side away from light sources such that light emission energies of the light sources at different locations in the function regions are equal. The patterned light adjusting units with the barrier wall units can guarantee even light diffusion in regions of the light sources surrounded by the barrier wall units to achieve even light emission of the entire surface of the backlight module, which advantages improvement of a light mixing effect. As such, the light adjusting layer in the present application can replace a conventional diffuser performing the same effect, and advantages an entire thickness of the backlight module under a prerequisite of even light emission of the entire surface.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

Figure 1A:
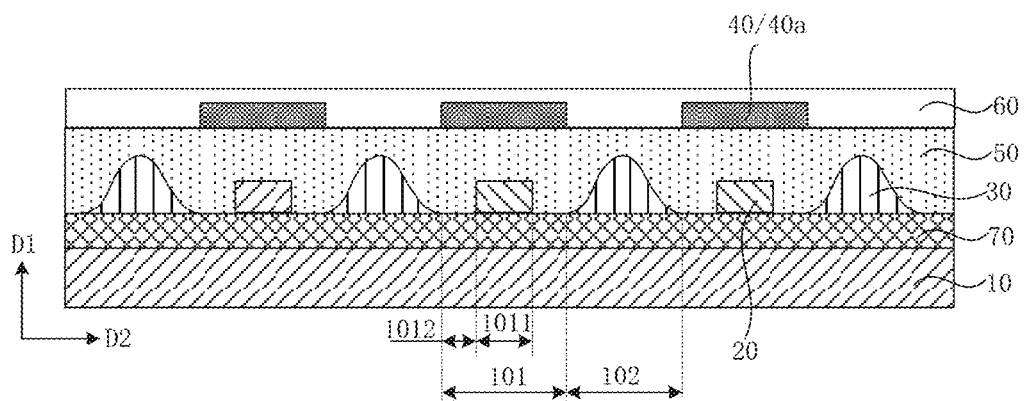
FIG. 1A is a schematic cross-sectional structural view of a first backlight module provided by an embodiment of the present application.

REFERENCE NUMERAL INDICATION 10, substrate; 101, function regions; 102, non-function regions; 1011, first function regions; 1012, second function regions; 1013, third function regions; 20, light sources; 30, barrier wall units; 40, light adjusting layer; 40a, patterned light adjusting units; 401, first light adjusting portion; 4011, first apertures; 402, second light adjusting portion; 4021, second apertures; 403, third light adjusting portion; 4031, third aperture; 50, encapsulation sealant layer; 60, protection layer; 70, reflection layer; D1, first direction; D2, second direction.

DETAILED DESCRIPTION OF SPECIFIC EMBODIMENTS OF THE INVENTION

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper"

and "lower", when not specified to the contrary explanation, usually refer to the upper and lower states of the device in actual use or working conditions, specifically according to the direction of the figures in the drawings. Furthermore, "inner" and "outer" refer to the outline of the device.

With reference to FIG. 1A, FIG. 1A is a schematic cross-sectional structural view of a first backlight module provided by an embodiment of the present application. The embodiment of the present application provides a backlight module, the backlight module comprises substrate 10, a plurality of light sources 20, a plurality of barrier wall units 30 and light adjusting layer 40. The substrate 10 comprises a plurality of function regions 101 and a plurality of non-function regions 102. The light sources 20 are disposed on a side of the substrate 10 and each of the function regions 101 comprises at least one of the light sources 20. The barrier wall units 30 are disposed on a side of the substrate 10. The barrier wall units 30 is disposed in the non-function regions 102. The light adjusting layer 40 is disposed on a side of a light exiting surface of the light sources 20. The light adjusting layer 40 comprises a plurality of patterned light adjusting units 40a. The patterned light adjusting units 40a are disposed to correspond to the function regions 101. The patterned light adjusting units 40a are configured to make light emission energies of the light sources 20 at different locations in the function regions 101 equal.

An orthographic projection of a side of the barrier wall units 30 away from the substrate 10 on the substrate 10 is a first orthographic projection, and an orthographic projection of a side of the barrier wall units 30 near the substrate 10 on the substrate 10 is a second orthographic projection. The first orthographic projection is within the second orthographic projection, namely, a cross section of the barrier wall units 30 on first direction D1 is a smooth convex arc surface having a high middle and low two ends. The first direction D1 is a thickness direction of the backlight module, the cross section is parallel to the second direction D2, and the second direction D2 is an extension direction of a connection line between central points of adjacent two of the light sources 20.

The embodiment of the present application disposes the barrier wall units 30 comprising specific shapes on the substrate 10, and light is reflected on the barrier wall units 30 and can be converted into exiting light along a collimation direction, which can reduce an optical waveguide effect of light between adjacent two of the light sources 20, advantages improvement of entire light emission brightness of the backlight module, and achieves high efficient light emission. Also, the light adjusting layer 40 comprising the patterned light adjusting units 40a is disposed on a side of the light exiting surface of the light sources 20, the patterned light adjusting units 40a with the barrier wall units 30 can guarantee even light diffusion in a region of the light sources 20 surrounded by the barrier wall units 30 to achieve even light emission of an entire surface of the backlight module, which advantages improvement of a light mixing effect. Thus, the light adjusting layer 40 in the present application can replace the conventional diffuser with the same effect, which advantages reduction of entire thickness of the backlight module under a prerequisite of achieving light emission of an entire surface.

It should be explained that light emission energies of the light adjusting layer 40 at different locations in the function regions 101 are equal, it comprises two circumstances of similarly equal light emission energies of the light adjusting layer 40 at different locations in the function regions 101 and absolutely equal light emission energies of the light adjusting layer 40 at different locations in the function regions 101. The similarly equal light emission energies of the light adjusting layer 40 at different locations in the function regions 101 means that a difference between the light emission energies of the light adjusting layer 40 at different locations in the function regions 101 is less than 5%.

In the embodiment of the present application, in an aspect of thinization, the substrate 10 is preferably a flexible underlay substrate 10 (polyimide, PI) or thinned glass substrate 10. Wirings on the substrate 10 are manufactured by a semiconductor formation process to achieve a thinned design and multi-division design of the substrate 10. An entire thickness of the substrate 10 is not greater than 0.1 millimeters. A driving method for the substrate 10 can be active or passive, which is not limited in the present embodiment.

The function regions 101 are configured to dispose the light sources 20. The non-function regions 102 are configured to dispose the barrier wall units 30. Each of the non-function regions 102 is disposed in a gap region between the light sources 20 disposed adjacently in adjacent two of the function regions 101. The function regions 101 and the non-function regions 102 are disposed alternately.

The light sources 20 are distributed on the substrate 10 in an array. The light sources 20 are mini-LED lamps. A chip in the mini-LED lamp is a flip chip, and a sapphire underlay on the chip requires a thinning process. Also, the sapphire underlay on the chip requires a process of a distributed bragg reflection (DBR) coating layer to increase a light emission angle of the chip. In particular, an entire thickness of the chip ranges from 30 to 60 microns.

The barrier wall units 30 use a material with a higher reflection rate. Large angle light emitted from the light sources 20 are reflected on a surface of the barrier wall units 30 to convert the large angle light into exiting light along a collimation direction, which is able to reduce an optical waveguide effect between adjacent ones of the light sources 20 and improve entire light emission brightness of the backlight module, and advantage achievement of high efficient light emission. Furthermore, a main type of reflection of the large angle light emitted from the light sources 20 a surface of the barrier wall units 30 is diffuse reflection, which can better form a light mixing effect in the chamber. One or more of the light sources 20 form light mixing chamber, and light mixing is processed in a range of one light mixing chamber by side and bottom reflection, which can mitigate crosstalk resulting from light emission among the light sources 20 or among the light sources 20 in the same region and advantage reduction of consumption of light emitted from the light sources 20 to locations among lamps to improve a light emission efficiency of the lamp board entire.

In an embodiment, a height of the barrier wall units 30 on the first direction D1 ranges from 0.2 millimeters to 0.5 millimeters, a width of the barrier wall units 30 on the second direction D2 ranges from 0.4 millimeters to 1 millimeter, and a height-width ratio of the barrier wall units 30 ranges from 1:2 to 1:1. Optionally, the height of the barrier wall units 30 on the first direction D1 is 0.3 millimeters, the width of the barrier wall units 30 on the second direction D2 is 0.6 millimeters, the height-width ratio of the barrier wall units 30 is 1:2.

The light adjusting layer 40 is a high reflection rate film layer, the light adjusting layer 40 has attributes of availability of photolithography and development patterning processes, in the embodiment of the present application, a reflection rate of the light adjusting layer 40 is greater than or equal to 90%, or, a light transmittance of the light adjusting layer 40 is less than or equal to 10%. A material for the light adjusting layer 40 is a high reflective and low light transmissive material. The material of the light adjusting layer 40 can be a metal material. The metal material is preferably aluminum and silver, a material of the light adjusting layer 40 can also be a high reflection glue material or organic white photoresist.

In the embodiment of the present application, the backlight module further comprises encapsulation sealant layer 50. The encapsulation sealant layer 50 covers the light sources 20 and a side of the barrier wall units 30 away from the substrate 10, the light adjusting layer 40 is disposed on a side of the encapsulation sealant layer 50 away from the substrate 10. Optionally, the encapsulation sealant layer 50 uses an organic silicone material. The encapsulation sealant layer 50 can be manufactured by a press molding process. The press molding process can guarantee flatness of a surface of the encapsulation sealant layer 50 and also can reduce a thickness of the encapsulation sealant layer 50 to achieve a thinning effect.

In the embodiment of the present application, a surface of a side of the encapsulation sealant layer 50 away from the substrate 10 is higher than a surface of a side of the barrier wall units 30 away from the substrate 10, in particular, a distance between a surface of a side of the encapsulation sealant layer 50 away from the substrate 10 and a top point of the barrier wall units 30 ranges from 0.1 millimeters to 0.2 millimeters.

Figure 1B:
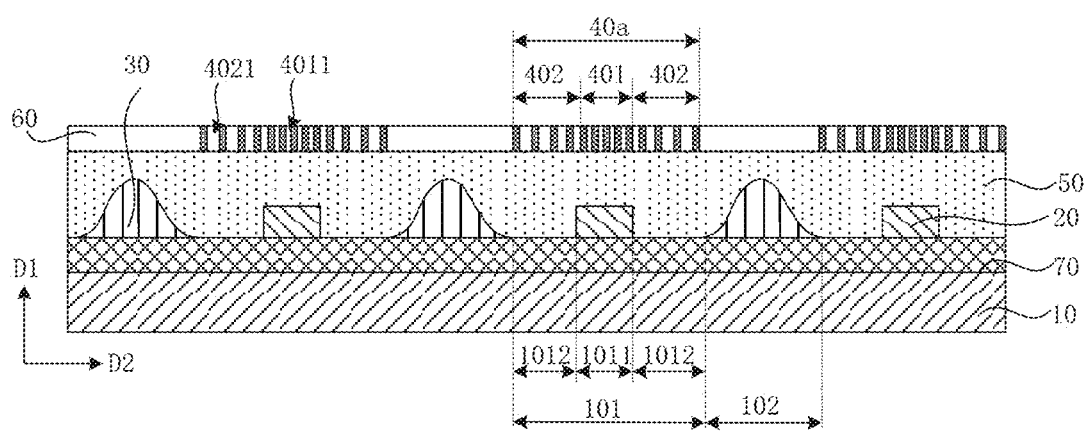
FIG. 1B is a detailed schematic cross-sectional structural view of a backlight module in FIG. 1A.
Figure 1C:
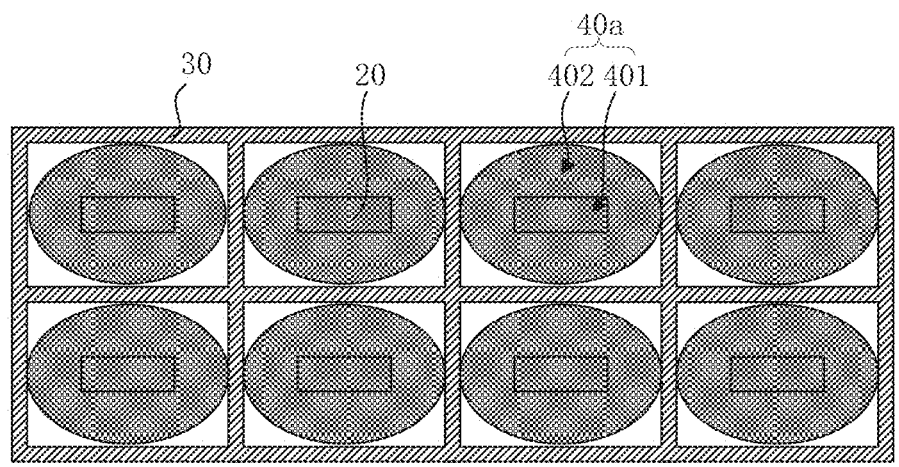
FIG. 1C is a schematic structural top view of the backlight module in FIG. 1A.

In an embodiment, with reference to FIG. 1B and FIG. 1C, FIG. 1B is a detailed schematic cross-sectional structural view of a backlight module in FIG. 1A; FIG. 1C is a schematic structural top view of the backlight module in FIG. 1A. Each of the function regions 101 is disposed with one of the light sources 20. Namely, each of the barrier wall units 30 is disposed around one of the light sources 20, a single one of the light sources 20 and a single one of the barrier wall units 30 form a light mixing chamber such that the single light source 20 is diffused evenly in the light mixing chamber to further achieve even light emission of an entire surface.

The function regions 101 comprises first function regions 1011 and second function regions 1012. In the present embodiment, the function regions 101 comprises one first function region 1011 and one the second function region 1012, the second function region 1012 surrounds a periphery of the first function regions 1011. The non-function regions 102 surround a periphery of the second function region 1012. The light sources 20 are disposed in the first function region 1011. The second function region 1012 is disposed between the first function region 1011 and the non-function regions 102. The second function regions 1012 refer to a gap region between the barrier wall unit 30 and adjacent one of the light sources 20. The patterned light adjusting units 40a comprises a first light adjusting portion 401 and a second light adjusting portion 402. The first light adjusting portion 401 is disposed to correspond to the light sources 20, namely, the first light adjusting portion 401 is disposed to correspond to the first function regions 1011. The first light adjusting portion 401 is disposed right above the light sources 20. The second light adjusting portion 402 is disposed to correspond to the second function regions 1012. Namely, the second light adjusting portion 402 is disposed correspondingly in the gap region between the barrier wall unit 30 and an adjacent one of the light sources 20. In the embodiment of the present application, the second light adjusting portion 402 surrounds the first light adjusting portion 401.

In the present embodiment, a light transmittance of the first light adjusting portion 401 is less than a light transmittance of the second light adjusting portion 402, and a light transmittance of the second light adjusting portion 402 gradually increases along a direction from a side near the first light adjusting portion 401 to a side away from the first light adjusting portion 401.

Figure 1D:
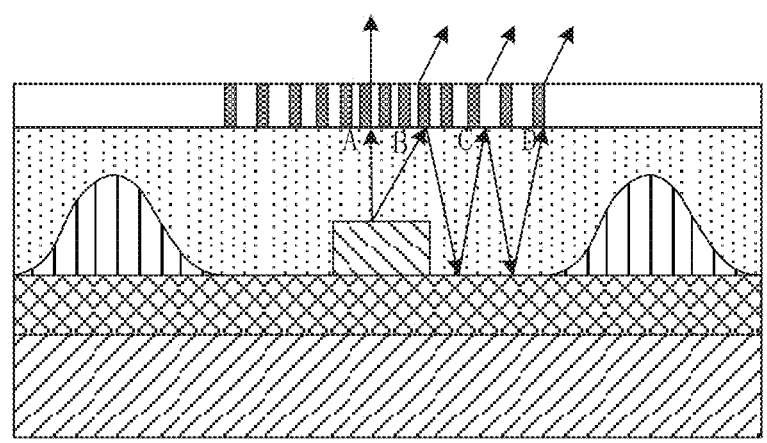
FIG. 1D is a schematic view of light mixing of light sources in FIG. 1A by patterned light adjusting units and barrier wall units.

It can be understood that with reference to FIG. 1D, FIG. 1D is a schematic view of light mixing of light sources 20 in FIG. 1A by patterned light adjusting units and barrier wall units. A location A in the first light adjusting portion 401 and three different locations B/C/D in the second light adjusting portion 402 are used as an example for explanation, because the location A is located right above the light sources 20 and has a highest reflection rate, a light emission intensity E1 at the location A is strongest. In the locations B/C/D, because the location B has a shortest distance from the light sources 20, the location C has a longer distance from the light sources 20, and the location D has the longest distance from the light sources 20, which results in that a light emission intensity E2 of the location B is strongest, a light emission intensity E3 of the location C is second strongest, and a light emission intensity E4 of the location D is weakest. Namely, light emission intensities E1, E2, E3, E4 of an optical waveguide of the light sources 20 at the locations A/B/C/D corresponds to an inequation: E1>E2>E3>E4. Therefore, the embodiment of the present application sequentially sets light transmittances of the light adjusting layer 40 at locations A/B/C/D as T1, T2, T3, T4, an inequation of T1<T2<T3<T4 is fulfilled to guarantee T1*E1=T2*E2=T3*E3=T4*E4, namely, to guarantee similar or equal light emission energies of the light sources 20 at different locations of the light adjusting layer 40 different locations such that the light emission energies at the locations A/B/C/D are similar or equal.

The embodiment of the present application, by defining apertures of different sizes in the light adjusting layer 40, adjusts the light transmittance at different locations. In particular, the first light adjusting portion 401 comprises a plurality of first apertures 4011, and the second light adjusting portion 402 comprises a plurality of second apertures 4021. An area of the first aperture 4011 is less than an area of the second aperture 4021. Along a direction from a side near the first light adjusting portion 401 to a side away from the first light adjusting portion 401, the area of the first aperture 4011 in the second light adjusting portion 402 gradually increases.

Again, the locations A/B/C/D are used as an example for explanation, because the location A has a high reflection rate, most light of the location A is transmitted to the location B. A light intensity of the location B is weaker than a light intensity of the location A. Setting an aperture area S2 of the light adjusting layer 40 at the location B to be greater than an aperture area S1 at the location A guarantees the light emission energy at the location B approaching the light emission intensity at the location A. Light at the location B is still partially reflected by the substrate 10 and transmitted to the location C. The light intensity at the location C is weaker than the light intensity at the location B. Setting an aperture area S3 of the light adjusting layer 40 at the location C to be greater than an aperture area S2 at the location B guarantees the light emission energy at the location C approaching light emission intensities of the location A and the location B. Light at the location C is still partially reflected by the substrate 10 and transmitted to the location D. A light intensity at the location D is weaker than a light intensity at the location C. Setting an aperture area S4 of the light adjusting layer 40 at the location D to be greater than an aperture area S3 at the location C guarantees the light emission energy of the location D approaching the light emission intensities of the location A, the location B, and the location C to guarantee similar or equal light emission energies of the light sources 20 at the locations A/B/C/D, to guarantee similar or equal light emission energies of the light sources 20 at different the locations of the second light adjusting portion 402, to guarantee similar or equal light emission energies of the light sources 20 at different the locations of the light adjusting layer 40.

It should be explained that because light at the location D is very weak, almost no light is reflected by the substrate 10 and transmitted to the barrier wall units 30. Therefore, in the embodiment of the present application, no light adjusting layer 40 is disposed right above the barrier wall units 30 to prevent the light adjusting layer 40 from blocking light.

Because the light intensity right above the light sources 20 are stronger and more even, in the embodiment of the present application, areas of the first apertures 4011 are equal.

In the present embodiment, a material of the light adjusting layer 40 being a photoresist material is used as an example, a protective glue layer is manufactured on the substrate 10, a layer of the photoresist material is coated on an upper surface of the protective glue layer. A film layer thickness of the photoresist material is in proportion to a reflection rate, and is controlled by adjusting a spinning speed in a process. Then a semiconductor process is used to pattern a surface of the photoresist to form several holes. During formation of the holes. The hole nearer the light sources 20 has a smaller size o. The more the hole farer away from the light sources 20 has a greater size to form a gradual variation process. Finally, a cleaning process is used to remove redundant photoresist to form the patterned light adjusting units 40a.

Figure 2A:
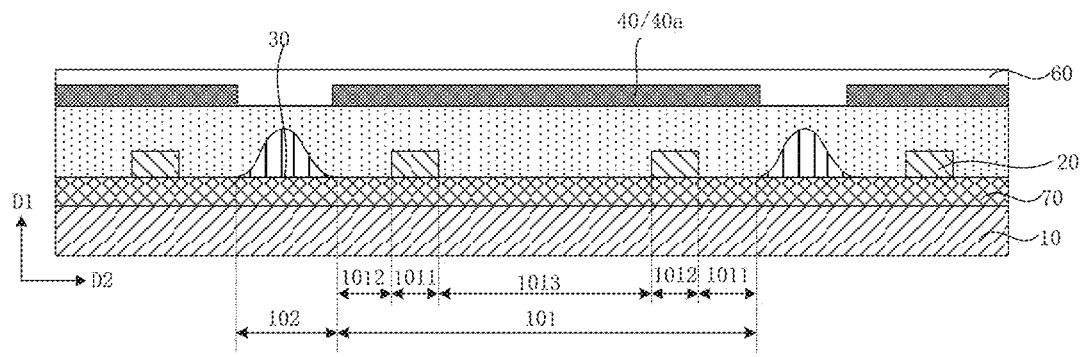
FIG. 2A is a schematic cross-sectional structural view of a second backlight module provided by the embodiment of the present application.

In another embodiment, with reference to FIG. 2A, FIG. 2A is a schematic cross-sectional structural view of a second backlight module provided by the embodiment of the present application. A difference of FIG. 2A from FIG. 1A is that the function region 101 is disposed with at least two of the light sources 20. Because the non-function regions 102 surround a periphery of the function regions 101 and the barrier wall units 30 is disposed in the non-function regions 102, the barrier wall units 30 surround the periphery of the function regions 101, namely the barrier wall units 30 surround the light sources 20, and the light sources 20 and the barrier wall units 30 form a light mixing chamber such that the light sources 20 has even light diffusion in light mixing chamber to further achieve even light emission of an entire surface.

Figure 2B:
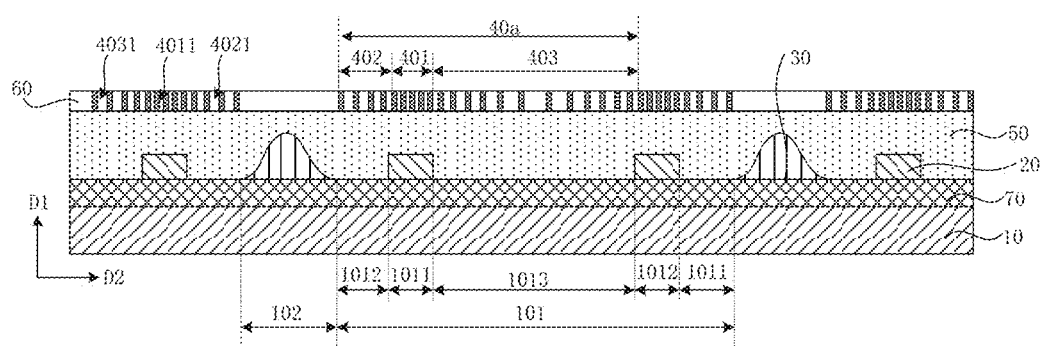
FIG. 2B is a detailed schematic cross-sectional structural view of the backlight module in FIG. 2A.
Figure 2C:
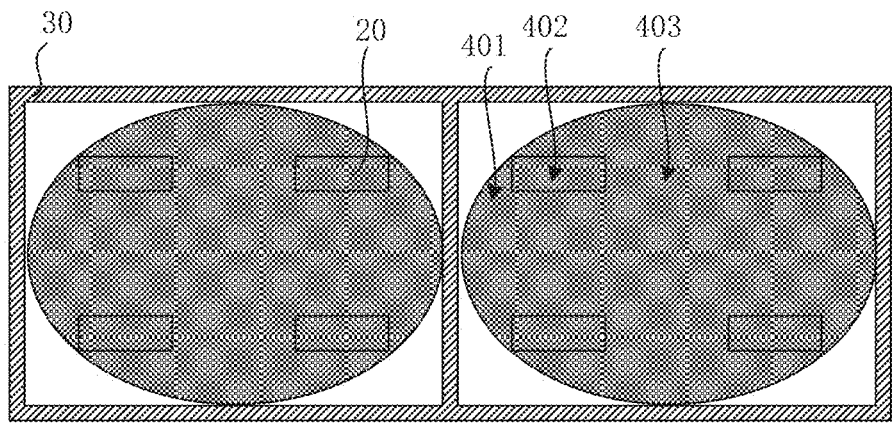
FIG. 2C is a schematic structural top view of the backlight module in FIG. 2A.

With reference to FIG. 2B and FIG. 2C, FIG. 2B is a detailed schematic cross-sectional structural view of the backlight module in FIG. 2A; FIG. 2C is a schematic structural top view of the backlight module in FIG. 2A. the function regions 101 comprises a plurality of first function regions 1011, a plurality of second function regions 1012 and a plurality of third function regions 1013, each of the first function regions 1011 is disposed with one of the light sources 20. Each of the second function regions 1012 is disposed between the first function region 1011 and the non-function region 102. The second function region 1012 refers to a gap region between the barrier wall unit 30 and an adjacent one of the light sources 20. Each of the third function regions 1013 is disposed between adjacent two of the first function regions 1011. The third function region 1013 refers to a gap region between adjacent two of the light sources 20 in each of the function regions 101. In the present embodiment, a number of the first function regions 1011 and the second function regions 1012 is equal to a number N of the light sources 20 in the function regions 101, and a number of the third function regions 1013 is equal to N−1.

Each of the patterned light adjusting units 40a comprises a first light adjusting portion 401, a second light adjusting portion 402, and a third light adjusting portion 403. The first light adjusting portion 401 is disposed to correspond to the light source 20, namely the first light adjusting portion 401 is disposed to correspond to the first function region 1011, and the first light adjusting portion 401 is disposed right above the light sources 20. The second light adjusting portion 402 is disposed to correspond to the second function regions 1012, namely the second light adjusting portion 402 is disposed correspondingly in a gap region between the barrier wall units 30 and adjacent one of the light sources 20. The third light adjusting portion 403 is disposed to correspond to the third function regions 1013, namely the third light adjusting portion 403 is disposed correspondingly in a gap region between adjacent two of the light sources 20 in the same function region 101. For the light sources 20 disposed adjacent to the barrier wall units 30, the second light adjusting portion 402 and the third light adjusting portion 403 are disposed on two sides of the light sources 20 respectively.

In an embodiment, the patterned light adjusting unit 40a can correspond to one light source 20, the patterned light adjusting unit 40a can also correspond to multiple light sources 20.

In the present embodiment, the light transmittance of first light adjusting portion 401 is less than the light transmittance of the second light adjusting portion 402 and the light transmittance of the third light adjusting portion 403, and along a direction from a side near the first light adjusting portion 401 to a side away from the first light adjusting portion 401, the light transmittance of the second light adjusting portion 402 and the light transmittance of the third light adjusting portion 403 gradually increase. It should be explained that an optical principle of the first light adjusting portion 401 and the second light adjusting portion 402 adjusting light emission energies of the light sources 20 at different locations to be similar or equal can refer to descriptions of the above embodiment for the locations A/B/C/D, and no repeated description is presented here.

Figure 2D:
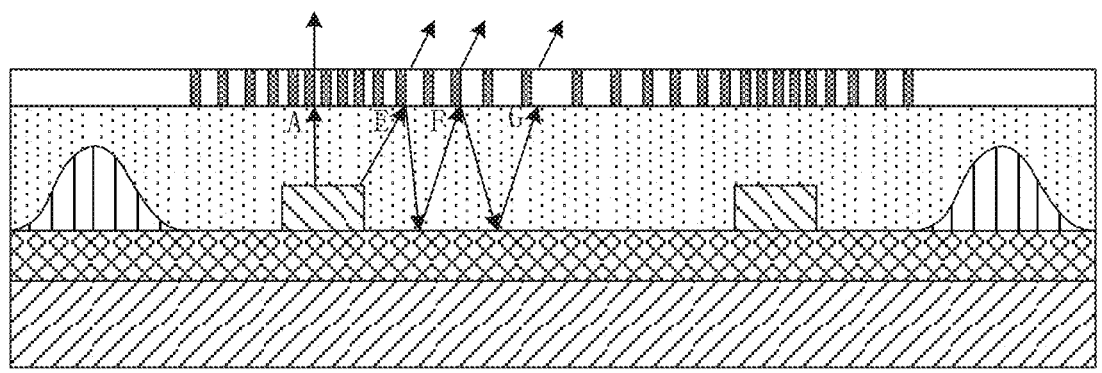
FIG. 2D is a schematic principle view of light mixing of light sources by patterned light adjusting units and barrier wall units in FIG. 2A.

It can be understood that with reference to FIG. 2D, FIG. 2D is a schematic principle view of light mixing of light sources by patterned light adjusting units and barrier wall units in FIG. 2A. The present embodiment uses the location A of the first light adjusting portion 401 and the three different locations E/F/G of the third light adjusting portion 403 as an example for explanations. Because the location A is located right above the light sources 20 and has a highest reflection rate, the light emission intensity E1 of the location A is strongest. In the locations E/F/G, because the location E has a shortest distance from the light sources 20, the location F has a longer distance from the light sources 20, and the location G has a longest distance from the light sources 20, it results in that a light emission intensity E5 of the location E is strongest, a light emission intensity E6 of the location C is second strongest, and a light emission intensity E7 of the location D weakest, namely, light emission intensities E1, E5, E6, E7 of an optical waveguide of the light sources 20 at the locations A/E/F/G correspond to an inequation: E1>E5>E6>E7. Therefore, the embodiment of the present application sequentially sets light transmittances of the light adjusting layer 40 at the locations A/E/F/G as T1, T5, T6, T7, an inequation of T1<T5<T6<T7 is fulfilled to guarantee T1*E1=T5*E5=T6*E6=T7*E7, namely to guarantee similar or equal light emission energies of the light sources 20 at different the locations of the light adjusting layer 40 such that the light emission energies of the locations A/E/F/G are similar or equal.

The embodiment of the present application, by defining apertures of different sizes in the light adjusting layer 40, adjusts the light transmittance at different locations. In particular, the first light adjusting portion 401 comprises a plurality of first apertures 4011, the second light adjusting portion 402 comprises a plurality of second apertures 4021, and the third light adjusting portion 403 comprises a plurality of third aperture 4031. An area of the first aperture 4011 is less than an area of the second aperture 4021 and an area of the third aperture 4031. Along a direction from a side near the first light adjusting portion 401 to a side away from the first light adjusting portion 401, the area of the first apertures 4011 in the second light adjusting portion 402 gradually increases, and the area of the third light adjusting portion 403 in the third aperture 4031 gradually increases.

Again, the locations A/E/F/G are used as an example for explanation, because the location A has a high reflection rate, most part of light of the location A is transmitted to the location E, and a light intensity of the location E is weaker than a light intensity of the location A. setting an aperture area S5 of the light adjusting layer 40 at the location E to be greater than an aperture area S1 at the A location guarantees that the light emission energy of the location E approaches a light emission intensity at the location A. Light of the location E is still partially reflected by the substrate 10 and transmitted to the location F. The light intensity at the location F is weaker than the light intensity at the location E. setting the aperture area S6 of the light adjusting layer 40 at the location F to be greater than the aperture area S5 at the location E guarantees that the light emission energy at the location F approaches light emission intensities of the location A the location E. Light at the location F is still partially reflected by the substrate 10 and transmitted to the location G, the light intensity at the location G is weaker than the light intensity at the location F. setting the aperture area S6 of the light adjusting layer 40 at the location G to be greater than the aperture area S6 of the location F guarantees that the light emission energy at the location G approaches light emission intensities at the location A, the location E, and the location F to further guarantee similar or equal light emission energies of the light sources 20 at the locations A/E/F/G, to further guarantee similar or equal light emission energies of the light sources 20 at different locations of the third light adjusting portion 403, and to further guarantee similar or equal light emission energies of the light sources 20 at different locations of the light adjusting layer 40.

Optionally, with further reference to FIGS. 1B and 2B, shapes of the first apertures 4011, the second apertures 4021, and the third aperture 4031 can be square, circular, triangular, polygonal, annular, and circularly curved. In the embodiment of the present application, the shapes of the first apertures 4011, the second apertures 4021, and the third aperture 4031 are circular.

In particular, in the embodiment of the present application, a width of the second function region 1012 along the second direction D2 is greater than or equal to 0.3 millimeters.

In the embodiment of the present application, along the second direction D2, a distance between adjacent two of the light sources 20 are p, a width of the barrier wall unit 30 is greater than or equal to p/2 and is less than or equal to p. mainly according to processes and optics, the width of the barrier wall unit 30 cannot be too large to cover soldering pads of the light sources 20, also the width of the barrier wall unit 30 cannot be too small to perform a light shielding function.

It can be understood that the light adjusting layer 40 in the present application can perform an even light mixing function of an entire surface, which is consistent with the diffuser in the conventional backlight module. Therefore, the light adjusting layer 40 can replace diffuser. The backlight module in the embodiment of the present application requires no diffuser, which advantages reduction of the entire thickness of the backlight module under a prerequisite of achieving entire surface light mixing of the backlight module.

In particular, a thickness of the light adjusting layer 40 ranges from 0.1 microns to 100 microns. Compared to the diffuser, its thickness is smaller and therefore can reduce the entire thickness of the backlight module.

In the embodiment of the present application, the backlight module further comprises protection layer 60, the protection layer 60 covers a side of the light adjusting layer 40 away from the substrate 10 comprises scratch resistance, is configured to prevent the light adjusting layer 40 from oxidized or scratched. A refractive index of the protection layer 60 is greater than or equal to a refractive index of the light adjusting layer 40 to prevent light emitted from the light adjusting layer 40 from undergoing a total reflection at a boundary between the light adjusting layer 40 and the protection layer 60, which advantages improvement of light emission efficiency. In particular, the refractive index of the protection layer 60 is greater than or equal to 1.5, Optionally, the refractive index of the protection layer 60 ranges from 1.5 to 2.5.

Optionally, a material of the protection layer 60 can use silicon oxide or silicon nitride. A thickness of the protection layer 60 ranges from 1 micron to 10 microns, its thickness is thinner and would not influence the thickness of the backlight module.

In the embodiment of the present application, the backlight module further comprises reflection layer 70, and the reflection layer 70 is disposed on the substrate 10. The light sources 20 and the barrier wall units 30 are disposed on a side of the reflection layer 70 away from the substrate 10. A material of the reflection layer 70 is a high reflection material, the high reflection material and organic silicone material comprise a better infiltration capability. Optionally, a material of the reflection layer 70 comprises one of white ink, white reflection film, and metal.

In an embodiment, the backlight module further comprises upper prism piece and lower prism piece (not shown in the figures). The lower prism piece is disposed on a side of the encapsulation sealant layer 50 away from the substrate 10. The upper prism piece is disposed on a side of the lower prism piece away from the substrate 10. The upper prism piece and the lower prism piece mainly performs a light converging effect to increase a brightness gain of the front viewing angle direction.

Figure 3:
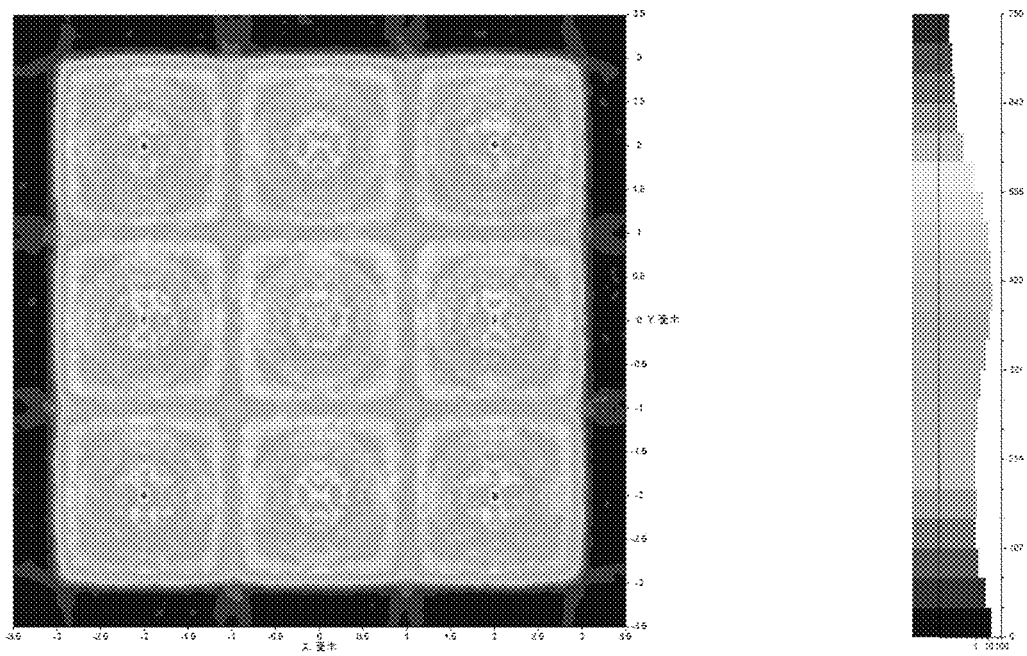
FIG. 3 is a brightness simulation view of the conventional backlight module without barrier wall units.
Figure 4:
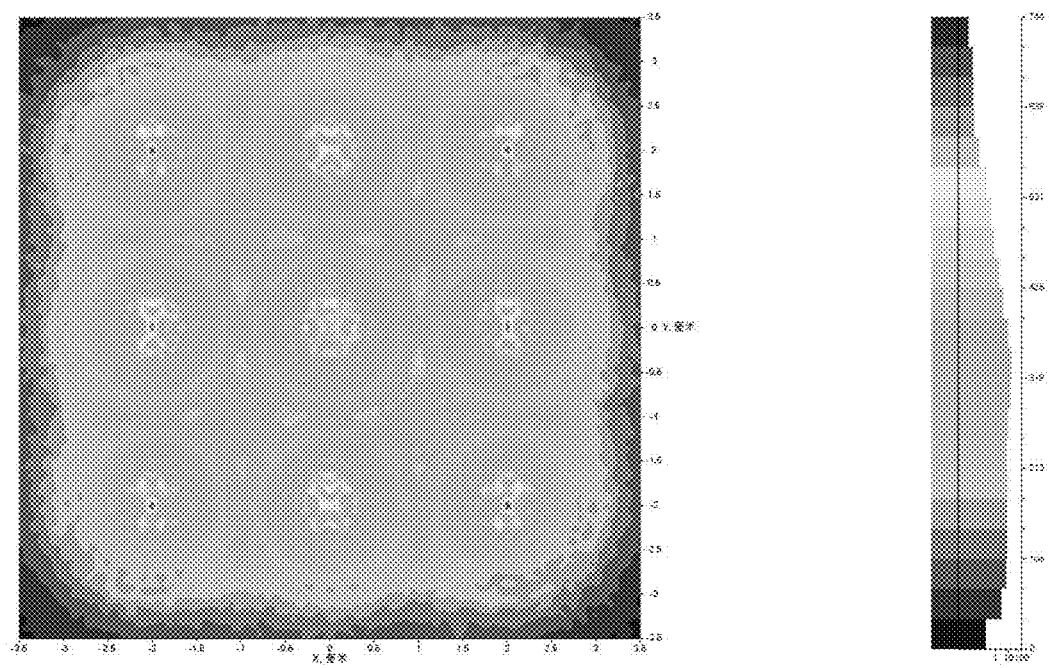
FIG. 4 is a brightness simulation view of the backlight module with barrier wall units provided by the embodiment of the present application.

With reference to FIGS. 3 and 4, FIG. 3 is a brightness simulation view of the conventional backlight module without barrier wall units; FIG. 4 is a brightness simulation view of the backlight module with barrier wall units provided by the embodiment of the present application. The patterned light adjusting units 40a are distributed in an array, an optical software is used to build a model of light sources 20 of a 3×3 array for simulation. It is assumed that a height of a tip point of the barrier wall unit 30 is set as 0.25 millimeters, a thickness of the encapsulation sealant layer 50 is 0.3 millimeters, under a condition of the same patterned light adjusting unit 40a, a light emission uniformity with the barrier wall units 30 and a light emission uniformity without the barrier wall units 30 are similar at a degree of 87%. Light emission energies of the light sources 20 with the barrier wall units 30 are set as 0.0493 lumen, light emission energies of the light sources 20 without the barrier wall units 30 are set as 0.0406 lumen. Therefore, an energy difference about 20% between having barrier wall units 30 and having none of the barrier wall units 30 energy exists, and under the condition of having the barrier wall units 30, light efficiency can be drastically increased.

Figure 5:
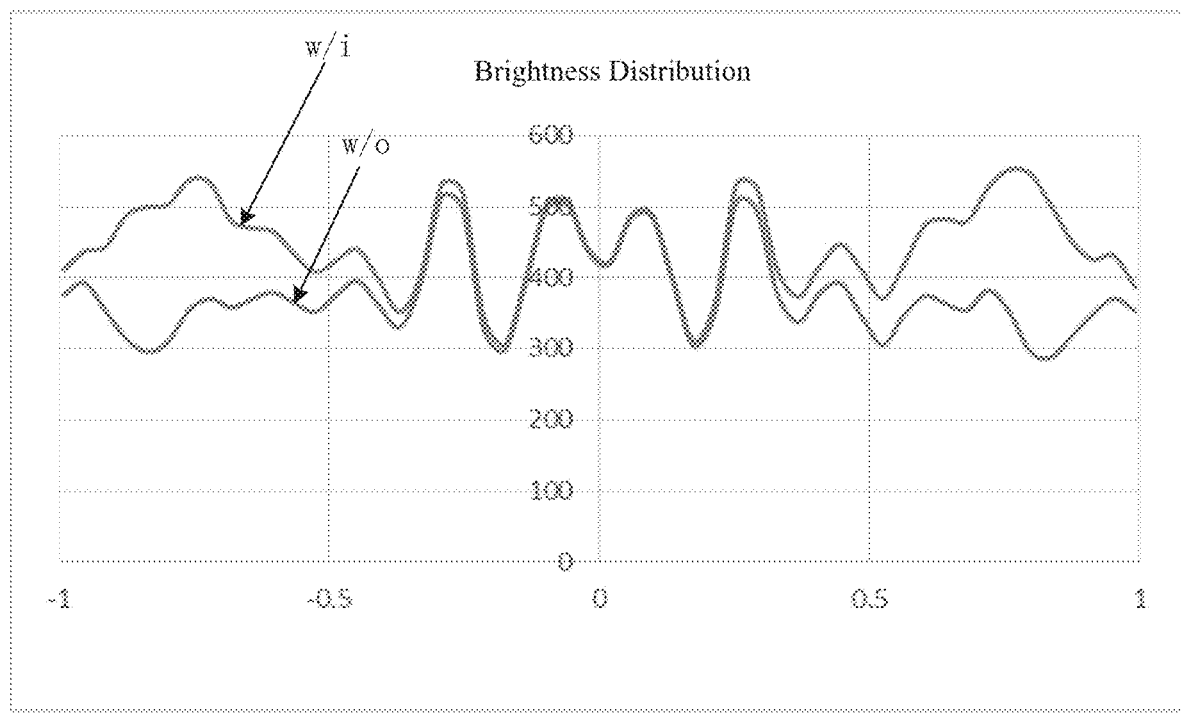
FIG. 5 is a brightness distribution simulation comparison chart of the backlight module with barrier wall units provided by the embodiment of the present application and the conventional backlight module without barrier wall units.

Furthermore, with reference to FIG. 5, FIG. 5 is a brightness distribution simulation comparison chart of the backlight module with barrier wall units provided by the embodiment of the present application and the conventional backlight module without barrier wall units. It should be explained that w/I in the figures is a light emission brightness curve of the light sources 20 disposed with the barrier wall units 30, w/o is a light emission brightness curve of the light sources 20 disposed with the barrier wall units 30. In an interval from −0.2 millimeters to 0.2 millimeters interval, light emission brightness of the light sources 20 disposed with the barrier wall units 30 and light emission brightness of the light sources 20 disposed without the barrier wall units 30 almost overlap. Namely, in a right upper region of the light sources 20, disposing the barrier wall units 30 has no influence to small angle direction light emission brightness. In an interval less than −0.2 microns or greater than 0.2 microns, light emission brightness of the light sources 20 with the barrier wall units 30 is greater than light emission brightness of the light sources 20 without the barrier wall units 30. Namely, increasing the barrier wall units 30 drastically improves light efficiency of a region around the barrier wall units 30.

The embodiment of the present application also provides a display device comprising the above backlight module. The display device further comprises a display panel, the display panel is disposed on a side of a light exiting surface of the backlight module. The backlight module can perform high efficient light emission and is configured to provide the display panel with a backlight. The display panel can achieve a display effect. The display device is a flexible liquid crystal display device, on the basis of thinning a thickness of the backlight module, the backlight module is bendable to further improve a bendable capability of the flexible liquid crystal display device.

Advantages are as follows: The backlight module and the display device of the present application dispose barrier wall units of specific shapes on a substrate, light reflected on surfaces of the barrier wall units can be converted to exiting light along a collimation direction, which can reduce an optical waveguide effect of light among adjacent light sources, advantages improvement of entire light emission brightness of the backlight module, and achieves high efficiency light emission. Also, a light adjusting layer comprising a plurality of patterned light adjusting units is disposed on a side of light exiting surfaces of the light sources such that light emission energies of the light sources at different locations in the function regions are equal. The patterned light adjusting units with the barrier wall units can guarantee even light diffusion in regions of the light sources surrounded by the barrier wall units to achieve even light emission of the entire surface of the backlight module, which advantages improvement of a light mixing effect. As such, the light adjusting layer in the present application can replace a conventional diffuser performing the same effect, and advantages an entire thickness of the backlight module under a prerequisite of even light emission of the entire surface.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:
1. A backlight module, comprising:
a substrate comprising a plurality of function regions and a plurality of non-function regions, wherein the non-function regions surround a periphery of the function regions;
a plurality of light sources disposed on a side of the substrate, wherein each of the function regions comprises at least two of the light sources;
a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and
a light adjusting layer disposed on a side of a light exiting surface of the light sources, wherein the light adjusting layer comprises a plurality of patterned light adjusting units, the patterned light adjusting units are disposed to correspond to the function regions, and a material of the light adjusting layer comprises aluminum and silver;
wherein the function regions comprise:
a plurality of first function regions disposed with the light sources;
a plurality of second function regions disposed between the first function regions and the non-function regions; and
a plurality of third function regions, wherein each of the third function regions is disposed between adjacent two of the first function regions;
wherein each of the patterned light adjusting units comprises:
a first light adjusting portion disposed to correspond to the light sources;
a second light adjusting portion disposed to correspond to the second function regions; and
a third light adjusting portion disposed to correspond to the third function regions; and
wherein a light transmittance of the first light adjusting portion is less than a light transmittance of the second light adjusting portion and a light transmittance of the third light adjusting portion, and the light transmittance of the second light adjusting portion and the light transmittance of the third light adjusting portion gradually increase along a direction from a side near the first light adjusting portion to a side away from the first light adjusting portion.

2. The backlight module according to claim 1, wherein the first light adjusting portion comprises a plurality of first apertures, the second light adjusting portion comprises a plurality of second apertures, the third light adjusting portion comprises a plurality of third aperture; and an area of each of the first apertures is less than an area of the second apertures and an area of each of the third apertures, and along the direction from the side near the first light adjusting portion to the side away from the first light adjusting portion, the area of each of the second apertures in the second light adjusting portion gradually increases and the area of each of the third apertures in the third light adjusting portion.

3. The backlight module according to claim 1, wherein a width of each of the second function regions along a second direction is greater than or equal to 0.3 millimeters, and the second direction is an extension direction of a connection line between central points of adjacent two of the light sources.

4. The backlight module according to claim 3, wherein along the second direction, a distance between adjacent two of the light sources is p, and a width of each of the barrier wall units is greater than or equal to p/2 and is less than or equal to p.

5. The backlight module according to claim 1, wherein a thickness of the light adjusting layer ranges from 0.1 microns to 100 microns.

6. A backlight module, comprising:
a substrate comprising a plurality of function regions and a plurality of non-function regions, wherein the non-function regions surround a periphery of the function regions;
a plurality of light sources disposed on a side of the substrate, wherein each of the function regions comprises at least two of the light sources;
a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and
a light adjusting layer disposed on a side of a light exiting surface of the light sources, wherein the light adjusting layer comprises a plurality of patterned light adjusting units, and the patterned light adjusting units are disposed to correspond to the function region;
wherein the function regions comprise:
a plurality of first function regions disposed with the light sources;
a plurality of second function regions disposed between the first function regions and the non-function regions; and
a plurality of third function regions, wherein each of the third function regions is disposed between adjacent two of the first function regions;
wherein each of the patterned light adjusting units comprises:
a first light adjusting portion disposed to correspond to the light sources;
a second light adjusting portion disposed to correspond to the second function regions; and
a third light adjusting portion disposed to correspond to the third function regions; and wherein a light transmittance of the first light adjusting portion is less than a light transmittance of the second light adjusting portion and a light transmittance of the third light adjusting portion, and the light transmittance of the second light adjusting portion and the light transmittance of the third light adjusting portion gradually increase along a direction from a side near the first light adjusting portion to a side away from the first light adjusting portion.

7. The backlight module according to claim 6, wherein the first light adjusting portion comprises a plurality of first apertures, the second light adjusting portion comprises a plurality of second apertures, the third light adjusting portion comprises a plurality of third aperture; and an area of each of the first apertures is less than an area of the second apertures and an area of each of the third apertures, and along the direction from the side near the first light adjusting portion to the side away from the first light adjusting portion, the area of each of the second apertures in the second light adjusting portion gradually increases and the area of each of the third apertures in the third light adjusting portion.

8. The backlight module according to claim 2, wherein a width of each of the second function regions along a second direction is greater than or equal to 0.3 millimeters, and the second direction is an extension direction of a connection line between central points of adjacent two of the light sources.

9. The backlight module according to claim 8, wherein along the second direction, a distance between adjacent two of the light sources is p, and a width of each of the barrier wall units is greater than or equal to p/2 and is less than or equal to p.

10. The backlight module according to claim 6, wherein a thickness of the light adjusting layer ranges from 0.1 microns to 100 microns.

11. The backlight module according to claim 10, wherein a reflection rate of the light adjusting layer is greater than or equal to 90%.

12. The backlight module according to claim 6, wherein the backlight module further comprises a protection layer, the protection layer covers a side of the light adjusting layer away from the substrate; wherein a refractive index of the protection layer is greater than or equal to a refractive index of the light adjusting layer.

13. The backlight module according to claim 6, wherein the backlight module further comprises an encapsulation sealant layer, the encapsulation sealant layer covers sides of the light sources and the barrier wall units away from the substrate, and the light adjusting layer is disposed on a side of the encapsulation sealant layer away from the substrate.

14. A display device, comprising a backlight module; and
a display panel disposed on a side of a light exiting surface of the backlight module;
wherein the backlight module comprises:
a substrate comprising a plurality of function regions and a plurality of non-function regions, wherein the non-function regions surround a periphery of the function regions;
a plurality of light sources disposed on a side of the substrate, wherein each of the function regions comprises at least two of the light sources;
a plurality of barrier wall units disposed on a side of the substrate, wherein the barrier wall units are disposed in the non-function regions, an orthographic projection of a side of the barrier wall units away from the substrate on the substrate is a first orthographic projection, an orthographic projection of a side of the barrier wall units near the substrate on the substrate is a second orthographic projection, and the first orthographic projection is within the second orthographic projection; and a light adjusting layer disposed on a side of a light exiting surface of the light sources, wherein the light adjusting layer comprises a plurality of patterned light adjusting units, and the patterned light adjusting units are disposed to correspond to the function region;

wherein the function regions comprise:
- a plurality of first function regions disposed with the light sources;
- a plurality of second function regions disposed between the first function regions and the non-function regions; and
- a plurality of third function regions, wherein each of the third function regions is disposed between adjacent two of the first function regions;

wherein each of the patterned light adjusting units comprises:
- a first light adjusting portion disposed to correspond to the light sources;
- a second light adjusting portion disposed to correspond to the second function regions; and
- a third light adjusting portion disposed to correspond to the third function regions; and wherein a light transmittance of the first light adjusting portion is less than a light transmittance of the second light adjusting portion and a light transmittance of the third light adjusting portion, and the light transmittance of the second light adjusting portion and the light transmittance of the third light adjusting portion gradually increase along a direction from a side near the first light adjusting portion to a side away from the first light adjusting portion.

\* \* \* \* \*